(12) United States Patent
Morishita

(10) Patent No.: US 11,766,616 B2
(45) Date of Patent: Sep. 26, 2023

(54) PROCESSING DEVICE, PROGRAM, AND METHOD

(71) Applicant: GungHo Online Entertainment, Inc., Tokyo (JP)

(72) Inventor: Kazuki Morishita, Tokyo (JP)

(73) Assignee: GungHo Online Entertainment, Inc.

( * ) Notice: Subject to any disclaimer, the term of this patent is extended or adjusted under 35 U.S.C. 154(b) by 316 days.

(21) Appl. No.: 17/386,722

(22) Filed: Jul. 28, 2021

(65) Prior Publication Data

US 2022/0134228 A1 May 5, 2022

Related U.S. Application Data

(63) Continuation of application No. PCT/JP2020/040981, filed on Oct. 30, 2020.

(51) Int. Cl.
*A63F 13/54* (2014.01)
*A63F 13/45* (2014.01)
(Continued)

(52) U.S. Cl.
CPC .............. *A63F 13/54* (2014.09); *A63F 13/45* (2014.09); *A63F 13/69* (2014.09); *A63F 13/814* (2014.09); *A63F 2300/6063* (2013.01)

(58) Field of Classification Search
CPC .......... A63F 13/54; A63F 13/45; A63F 13/69; A63F 13/814; A63F 2300/6063; A63F 13/35; A63F 13/792
(Continued)

(56) References Cited

U.S. PATENT DOCUMENTS

| 10,449,459 | B2 * | 10/2019 | Kitamura | A63F 13/814 |
| 2009/0176575 | A1 * | 7/2009 | Terao | A63F 13/71 463/42 |

(Continued)

FOREIGN PATENT DOCUMENTS

| JP | 2007-209604 A | 8/2007 |
| JP | 2012-183174 A | 9/2012 |

(Continued)

OTHER PUBLICATIONS

My Music Select, Sumabura-ken!! [online], Sep. 7, 2007, URL: https://www.smashbros.com/wii/jp/music/music08.html (3 pages).
(Continued)

*Primary Examiner* — Pierre E Elisca
(74) *Attorney, Agent, or Firm* — Harness, Dickey & Pierce, P.L.C.

(57) ABSTRACT

A processing device includes a communication interface configured to be communicably connected via a network with one or a plurality of terminal devices, a memory configured to store a program and music piece information that being associated with one or a plurality of users including a first user holding a first terminal device, and a processor configured to execute the program. The processor is configure to cause a game application to progress in the first terminal device in accordance with operation information input at the first terminal device, select first music piece information from the stored music piece information in accordance with a progress result of the game application, and transmit the selected first music piece information to the first terminal device via the communication interface.

10 Claims, 9 Drawing Sheets

(51) Int. Cl.
*A63F 13/69* (2014.01)
*A63F 13/814* (2014.01)

(58) Field of Classification Search
USPC .......................................................... 463/35
See application file for complete search history.

(56) References Cited

U.S. PATENT DOCUMENTS

| | | | |
|---|---|---|---|
| 2018/0147487 A1* | 5/2018 | Beppu | A63F 13/352 |
| 2019/0126147 A1* | 5/2019 | Nogami | A63F 13/35 |
| 2019/0184283 A1* | 6/2019 | Kim | A63F 13/35 |
| 2019/0213566 A1* | 7/2019 | Ju | A63F 13/77 |
| 2019/0217190 A1* | 7/2019 | Shitara | A63F 13/792 |
| 2022/0134228 A1* | 5/2022 | Morishita | A63F 13/69 463/35 |

FOREIGN PATENT DOCUMENTS

| | | |
|---|---|---|
| JP | 2017-055898 A | 3/2017 |
| JP | 2020-168486 A | 10/2020 |

OTHER PUBLICATIONS

Darekato/Okiraku Fighting, Sumabura-ken!! [online], Dec. 7, 2007 URL: https://www.smashbros.com/wii/jp/gamemode/wi-fi/wi-fi04.html (5 Pages).

Fanfare, Great Fray Smash Brothers Wiki [online], Aug. 29, 2018, URL:https://smashwiki.info/index.php?title=%E3%83%95%E3%82%A1%E3%83%B3%E3%83%95%E3%82%A1%E3%83%BC%E3%83%AC&oldid=52057 (8 Pages).

Last Trump Card, Niko-niko Encyclopedia [online], Aug. 2, 2014, URL: https://web.archive.org/web/2014082050900/ https://dic.nicovideo.jp/a/%E6%9C%80%E5%BE%8C%E3%81%AE%E5%88%87%E3%82%8A%E3%81%B5%E3%81%A0, (6 Pages).

Custom sound, Superhero generation [online], Dec. 25, 2019, URL: https://web.archive.org/web/20191225033522/ http://ds-can.com:80/superhero/game/custom.html, (2 Pages).

Producing a victory, Great Fray Smash Brothers Wiki [online], Oct. 8, 2018, URL:https://smashwiki.info/index.php?title=%E5%8B%9D%E5%88%A9%E6%BC%94%E5%87%BA&oldid=53658, (6 Pages).

* cited by examiner

| MUSIC PIECE ID | PRICE | TITLE | ATTRIBUTES | MUSIC PIECE DATA | ... |
|---|---|---|---|---|---|
| S1 | C1 | T1 | A1 | D1 | ... |
| S2 | C2 | T2 | A2 | D2 | ... |
| S3 | C3 | T3 | A3 | D3 | ... |
| S4 | C4 | T4 | A4 | D4 | ... |
| S5 | C5 | T5 | A5 | D5 | ... |
| ... | ... | ... | ... | ... | ... |

FIG. 4B

| USER ID | USER NAME | CHARACTER | IN-GAME CURRENCY | MUSIC PIECE ID | DIRECTION ID | ... |
|---|---|---|---|---|---|---|
| U1 | N1 | P1 | V1 | S1 | E1 | ... |
| U2 | N2 | P2 | V2 | S2 | E2 | ... |
| U3 | N3 | P3 | V3 | S3 | E3 | ... |
| U4 | N3 | P4 | V4 | S4 | E4 | ... |
| U5 | N5 | P5 | V5 | S5 | E5 | ... |
| ... | ... | ... | ... | ... | ... | ... |

FIG. 5

| | t1 t2 | t3 | t4 t5 | | t6 t7 t8 t9 | | t10 |
|---|---|---|---|---|---|---|---|
| USER U1 | NORMAL | | KILLER TECHNIQUE | NORMAL | KILLER TECHNIQUE | NORMAL | WIN |
| USER U2 | NORMAL | KILLER TECHNIQUE | NORMAL | | KILLER TECHNIQUE | NORMAL | LOSE |
| DIRECTION | NONE | E2 | NONE | E1 | NONE | E1 / E2 | NONE | E1 |
| MUSIC PIECE | NORMAL | S2 | NORMAL | | S1 | NORMAL | S1 |

PROCESSING DEVICE, PROGRAM, AND METHOD

CROSS-REFERENCE TO RELATED APPLICATIONS

The present application is a continuation application of International Application No. PCT/JP2020/040981, filed on Oct. 30, 2020, which is expressly incorporated herein by reference in its entirety.

BACKGROUND

1. Technical Field

The present disclosure relates to a processing device, a program, and a method for executing a game application in which music associated with a user is reproduced.

2. Related Art

Conventionally, a system in which BGM and an environmental sound corresponding to a game scene is output has been known. For example, Japanese Patent Publication No. 2007-209604 A describes a system in which an environmental sound representing "sound of the wind" is output along with a predetermined BGM when a scene of a motion of a character operated by the player in a place where the wind is blowing is displayed on a game screen, and an environmental sound representing "sound of leaves" is output along with the predetermined BGM when a scene of a motion of a character operated by the player in the forest is displayed on the game screen.

SUMMARY

On the basis of the above-described technology, the present disclosure provides a processing device, a program, and a method that are capable of providing the user with a new experience by outputting more various music pieces according to various embodiments.

Solution to Problem

According to an aspect of the present disclosure, provided is a "processing device including: a communication interface configured to be communicably connected via a network with one or a plurality of terminal devices including a first terminal device; a memory configured to store, in addition to a predetermined instruction command, music piece information stored in association with one or a plurality of users including a first user holding the first terminal device; and a processor configured to perform control for, on the basis of the predetermined instruction command, causing a game application to progress in the first terminal device in accordance with operation information input at the first terminal device, selecting one piece of music piece information from among music piece information stored in association with the one or plurality of users in accordance with a result of progress of the game application, and transmitting the selected one piece of music piece information to the first terminal device via the communication interface".

According to an aspect of the present disclosure, provided is a "program that causes a computer including: a communication interface configured to be communicably connected via a network with one or a plurality of terminal devices including a first terminal device; and a memory configured to store music piece information stored in association with one or a plurality of users including a first user holding the first terminal device to function as a processor configured to cause a game application to progress in the first terminal device in accordance with operation information input at the first terminal device, select one piece of music piece information from among music piece information stored in association with the one or plurality of users in accordance with a result of progress of the game application, and transmit the selected one piece of music piece information to the first terminal device via the communication interface".

According to an aspect of the present disclosure, provided is a "method carried out by executing a predetermined instruction command by a processor in a computer including: a communication interface configured to be connected; and a memory configured to store, in addition to the predetermined instruction command, music piece information stored in association with one or a plurality of users including a first user holding the first terminal device, the method including a step of causing a game application to progress in the first terminal device in accordance with operation information input at the first terminal device, a step of selecting one piece of music piece information from among music piece information stored in association with the one or plurality of users in accordance with a result of progress of the game application, and a step of transmitting the selected one piece of music piece information to the first terminal device via the communication interface".

According to various embodiments of the present disclosure, it is possible to provide a processing device, a program, and a method that are capable of providing the user with a new experience by outputting more various music pieces according to various embodiments.

Note that the above effects are illustrative only for convenience of explanation and are not limiting. In addition to or in place of the above effects, it is also possible to achieve any of the effects described in the present disclosure or any effect that is obvious to those skilled in the art.

BRIEF DESCRIPTION OF THE DRAWINGS

FIG. 4A is a view conceptually showing a music piece information table stored in the server device 200 according to the first embodiment of the present disclosure. FIG. 4B is a view conceptually showing a user information table stored in the server device 200 according to the first embodiment of the present disclosure.

FIG. 5 is a view showing a time transition of a musical piece or the like to be output in a game application according to the first embodiment of the present disclosure.

DESCRIPTION OF EXEMPLARY EMBODIMENTS

Figure 1:
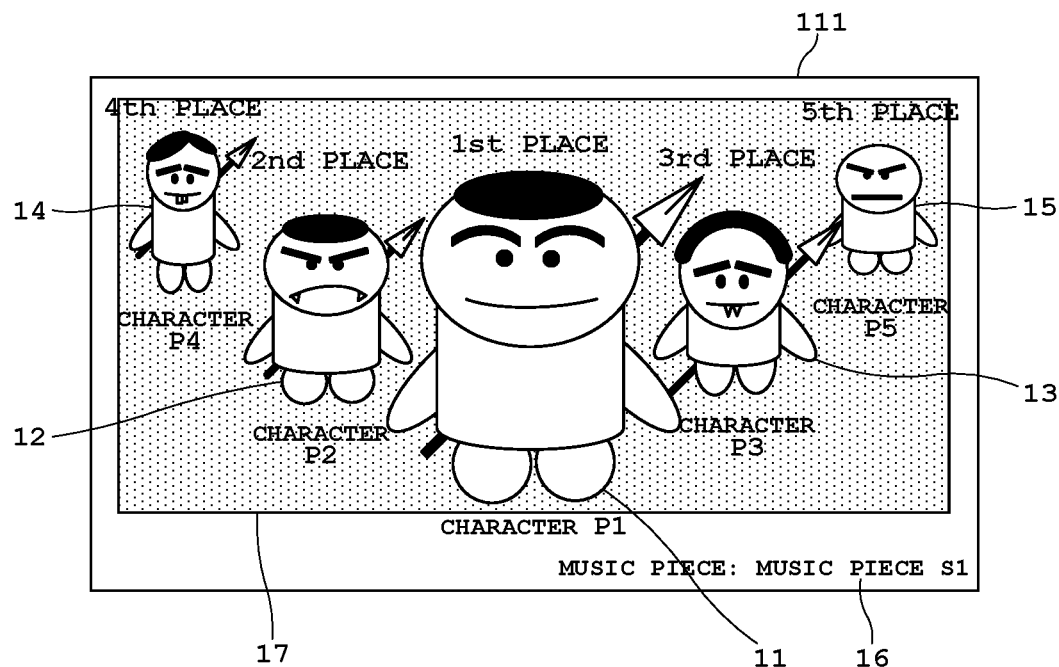
FIG. 1 is a view showing an example of a screen displayed on a terminal device 100 according to various embodiments of the present disclosure.

Various embodiments of the present disclosure will be described with reference to the accompanying drawings. Note that the identical reference numerals are given to the common components in the drawings.
Outline of Application According to the Present Disclosure In the game application according to various embodiments of the present disclosure, it is possible to store a specific music piece in association with each user in advance, and to output the associated music piece in accordance with the progress of the game.

Typical examples of such game applications include a competition game application played by one or a plurality of users using their own characters and virtual objects, and/or non-player characters or non-player virtual objects. However, the system according to the present disclosure is not limited to the above examples, and can also be preferably applied to various game applications such as sports games, puzzle games, battle games, and role-playing games. Note that although it is not intended to limit the system to a specific game application, an outline of the system according to the present disclosure will be described with an example of a competition game application.

FIG. 1 is a view showing an example of the screen displayed on the terminal device 100 according to various embodiments of the present disclosure. According to FIG. 1, as a result of executing the competition game application, the terminal device 100 displays a result display screen in which the ranking among the users (characters owned by the users) has been determined. Specifically, virtual characters P1 to P5 ranked from the first-place to fifth-place in accordance with the points earned by the competition game application are displayed at positions 11 to 15 corresponding to the ranking, respectively. At this time, the virtual characters are displayed so that the size of the virtual characters varies according to the ranking. In a music piece information display region 16 at the lower right of the result display screen, music piece ID information of the music piece currently being output from a speaker connected to the terminal device 100 is displayed. That is, during display of this result display screen, a music piece S1 associated with a user U1 capable of operating the virtual character P1 is being output from the speaker. A direction display region 17 is displayed on the result display screen. In the direction display region 17, a direction (e.g., "Congratulations on the victory of the user U1!") associated in advance with the user U1 capable of operating the virtual character P1 is displayed.

Thus, it is possible to perform more various direction expressions by outputting a music piece associated with a winning user (e.g., the first-place user) on the result display screen of the competition game application.

Note that in the present disclosure, the processing device includes both the terminal device 100 and the server device 200. That is, the processing according to each embodiment shown below can be carried out by either the terminal device 100 or the server device 200.

In the example of FIG. 1, the music piece associated with each user is output on the result display screen, but the music piece associated with each user may be similarly output on other screens. For example, a music piece associated with each user may be output on a screen in which a killer technique is implemented by inputting specific operation information in a competition game application, or on a screen in which a character of an opponent user is damaged as a result of the implementation.

Not only the music piece associated with each user but also the direction associated with each user, including the background image and the movement of the character and displayed on the display, may be output. Note that such direction is made up by appropriately combining various pieces of drawing information such as a virtual character, a virtual object, and a virtual item. Feedback such as vibration of a controller may be further combined.

The competition game application is merely an example of the game application. Such a game application may progress by a user alone, or may progress by, in addition to the user, a non-player virtual character or a non-player virtual object operated by computer control, another user or a plurality of other users, and a combination thereof.

In the example shown in FIG. 1, the music piece and direction associated with the winning user (first-place user) are output not only to the terminal device of the winning user but also to the terminal devices of other users. However, the present invention is not limited to this, and a different music piece and direction may be output for each user so that the music piece and direction of the winning user are output to the terminal device of the winning user and the music pieces and directions of other users are output to the terminal devices of the other users.

The game progressing by executing the game application includes a plurality of unit games. This unit game refers to a collection of one or a plurality of games executed in a game application, and is, by way of example, called a quest, a scenario, a chapter, a dungeon, a mission, an event, a match, or a competition. That is, the term "result" in the game application may mean a result obtained by completing each unit game or may mean a result obtained across a plurality of unit games. The term "in the middle" of the progress of the game application may mean a state in which each unit game is being executed or may mean a state in which a plurality of unit games are being executed.

First Embodiment

Figure 2:
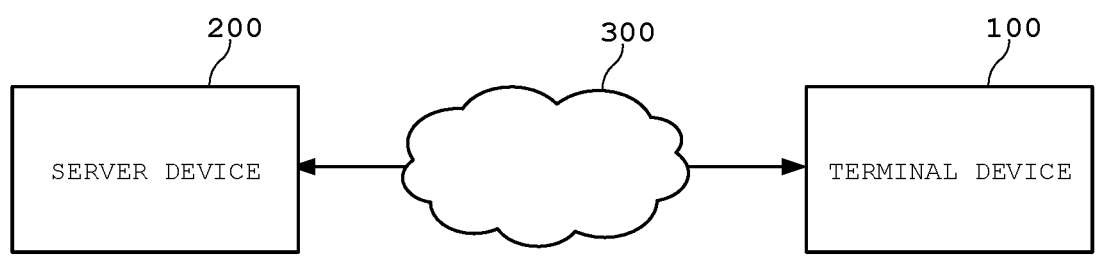
FIG. 2 is a conceptual diagram schematically showing a configuration of a system 1 according to a first embodiment of the present disclosure.

1. Configuration of the System 1 According to the First Embodiment of the Present Disclosure FIG. 2 is a conceptual diagram schematically showing the configuration of the system 1 according to the first embodiment of the present disclosure. Referring to FIG. 2, the system 1 includes the terminal device 100 and the server device 200 communicably connected with the terminal device 100 via a network 300. In the system 1, the server device 200 and the terminal device 100 execute a program stored in the memory, whereby the processing of the game application according to the present embodiment is executed. The server device 200 and the terminal device 100 communicate with each other as needed to transmit and receive various kinds of information (e.g., FIGS. 4A and 4B), programs, and the like necessary for the progress of the game application.

Note that the example of FIG. 2 includes only one terminal device 100, but may include two or more terminal devices 100 naturally. Although the server device 200 is described as a single device, each component and processing of the server device 200 can be distributed to a plurality of server devices. Furthermore, although the game application according to the present embodiment is executed by the system 1 including the server device 200 and the terminal device 100, the game application can be executed by only one terminal device 100 or a plurality of terminal devices without using the server device 200.

2. Configuration of the Terminal Device 100

Figure 3A:
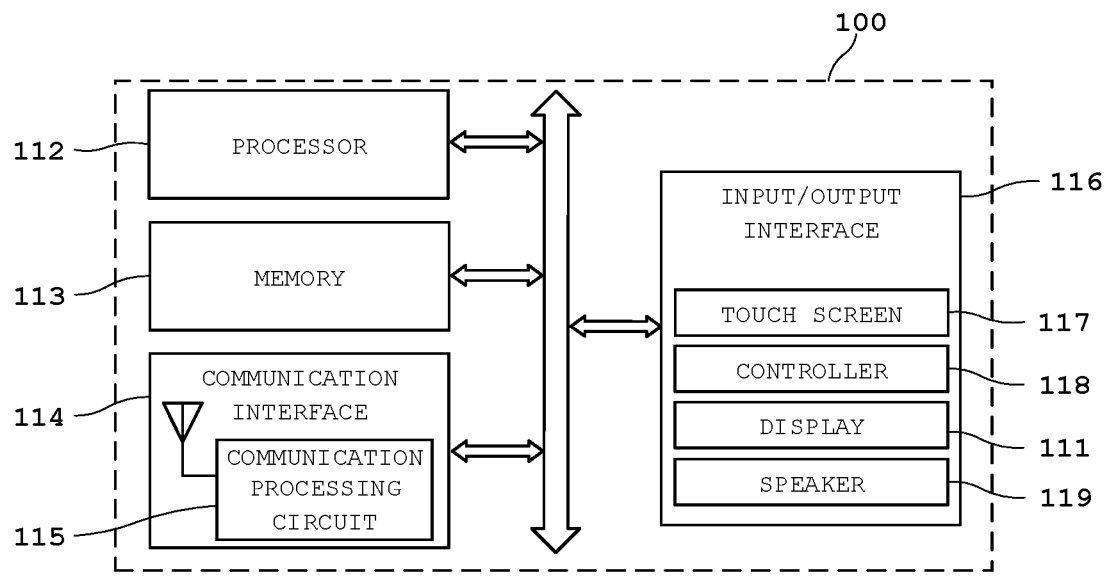
FIG. 3A is a block diagram showing an example of a configuration of the terminal device 100 according to the first embodiment of the present disclosure.

FIG. 3A is a block diagram showing an example of the configuration of the terminal device 100 according to the first embodiment of the present disclosure. The terminal device 100 does not need to include all of the components shown in FIG. 3A. The terminal device 100 can have a configuration in which some of the components are omitted or other components are added.

An example of the terminal device 100 is a stationary game machine. However, any other device capable of executing the game application according to the present disclosure, such as a mobile terminal device capable of wireless communication typified by a smartphone, a mobile game machine, a feature phone, a mobile information terminal, a PDA, a laptop personal computer, and a desktop personal computer, can be preferably applied. In a case where the game application according to the present disclosure is executed by a plurality of the terminal devices 100, each of the terminal devices 100 does not necessarily have to be the same or of the same type. For example, one terminal device 100 may be a stationary game machine and the other terminal device 100 may be a portable game machine.

According to FIG. 3A, the terminal device 100 includes a processor 112, a memory 113 including a RAM, a ROM, or a non-volatile memory (HDD in some cases), a communication interface 114 including a communication processing circuit 115 and an antenna, a touch screen 117, a controller 118, a display 111, and an input/output interface 116 for connection to a speaker 119. The components are electrically connected to one another via a control line and a data line. Note that the touch screen 117, the controller 118, the display 111, the speaker 119, and the like may be installed outside the terminal device 100 and connected via the input/output interface 116, or may be included in the terminal device 100 and connected via the input/output interface 116.

The processor 112 includes a CPU (microcomputer) and functions as a control unit that controls other components connected on the basis of various programs stored in the memory 113. Specifically, the processor 112 reads, from the memory 113, a program for executing the game application according to the present embodiment and a program for executing the OS and executes the program. In the present embodiment, the processor 112 executes processing of selecting a music piece at a position on the basis of an operation input having been input via the input/output interface 116 from the music piece list output to the display 111, processing of transmitting user identification information for specifying the music piece at the selected position and the user who has made the selection to the server device 200 via the communication interface 114, processing of transmitting, to the server device 200 via the communication interface 114, operation information having been input via the input/output interface 116 in accordance with the progress of the game application, processing of receiving display information including direction information and music piece information from the server device 200 via the communication interface 114, processing of outputting the direction or music piece to the display 111 or the speaker 119 via the input/output interface 116 on the basis of the received display information, and the like. Note that the processor 112 may include a single CPU but may include a plurality of CPUs. Other types of processors such as GPUs specialized in image processing may be appropriately combined.

The memory 113 includes a ROM, a RAM, a non-volatile memory, and an HDD, and functions as a storage unit. The ROM stores instruction commands for executing the application and OS according to the present embodiment as a program. The RAM is a memory used for writing and reading data while a program stored in the ROM is being processed by the processor 112. The non-volatile memory is a memory in which writing and reading of data is executed by the execution of the program, and the data written therein is stored even after the execution of the program ends. In the present embodiment, the memory 113 stores programs for processing of selecting a music piece at a position on the basis of an operation input having been input via the input/output interface 116 from the music piece list output to the display 111, processing of transmitting user identification information for specifying the music piece at the selected position and the user who has made the selection to the server device 200 via the communication interface 114, processing of transmitting, to the server device 200 via the communication interface 114, operation information having been input via the input/output interface 116 in accordance with the progress of the game application, processing of receiving display information including direction information and music piece information from the server device 200 via the communication interface 114, processing of outputting the direction or music piece to the display 111 or the speaker 119 via the input/output interface 116 on the basis of the received display information, and the like. Note that although not illustrated in particular, the memory 113 may be connected with a removable storage medium, a database, and the like via the input/output interface 116.

The communication interface 114 functions as a communication unit that transmits and receives information to and from the remotely installed server device 200 and other terminal devices via the communication processing circuit 115 and the antenna. The communication processing circuit 115 performs processing for receiving, from the server device 200 in accordance with the progress of the game application, a program for executing the game application according to the present embodiment and various types of information used in the game application. The communication processing circuit 115 also performs processing for transmitting the result of the processing by the execution of the game application to the server device 200. In the present embodiment, user ID information, selection information, operation information, and the like are transmitted to the server device 200 in particular, and display information and the like including music piece list information, music piece information, and direction information are received from the server device 200.

The communication processing circuit 115 is processed on the basis of a wideband wireless communication system represented by an LTE system, but it may be processed on the basis of a system related to narrowband wireless communication such as a wireless LAN represented by an IEEE802.11 or Bluetooth (registered trademark). It is also possible to use wired communication instead of or in addition to wireless communication.

The input/output interface 116 is connected by wire or wirelessly with the touch screen 117, the controller 118, the display 111, the speaker 119, and the like, and functions as an input/output unit that inputs and outputs various types of information. Examples of the input/output interface 116 include various methods such as a serial port, a parallel port, and a USB. In a case of wireless (e.g., Bluetooth (registered trademark)) connection, it is also possible to use the communication interface 114 and its function in combination.

Components such as the touch screen 117, the controller 118, the display 111, and the speaker 119 are connected to the terminal device 100 via the input/output interface 116. Note that the terminal device 100 may include these components or may not include these components.

The touch screen 117 is disposed so as to cover the display 111, for example, and outputs, to the processor 112, information of position coordinates corresponding to image data displayed by the display 111. As the touch screen method, a known method such as a resistance film method, a capacitance coupling method, and an ultrasonic surface acoustic wave method can be used. In the present embodiment, the touch screen 117 detects a swipe operation or a tap operation with respect to each icon or the like displayed on the display 111 by an indicator. Then, it is detected that an input related to the speed of movement is made in accordance with the detected tap operation. Note that the input/output interface 116 included in the terminal device 100 is used in the present embodiment, but it is also possible to use the input/output interface 116 that is connected wirelessly or by wire to the main body including the processor 112 or the like. The controller 118, which includes a hardware key including, for example, a cross key and one or a plurality of function keys, is held by the user's hand to perform various operation inputs by operating these hardware keys to the terminal device 100. Note that the touch screen 117 and the controller 118 each function as an operation input unit.

In response to an instruction from the processor 112, the display 111 reads image information stored in the memory 113 and functions as a display unit that performs various displays (e.g., FIGS. 9 to 12 and the like) including a virtual game space formed by the game application according to the present embodiment. The display 111 includes, for example, a liquid crystal display and an organic EL display.

In response to an instruction from the processor 112, the speaker 119 reads audio data stored in the memory 113 and functions as an audio output unit that outputs various types of audio used in the game application according to the present embodiment. In particular, in the present embodiment, upon receiving music piece information associated with each user, audio data of a music piece corresponding to the music piece information is read and output.

3. Configuration of the Server Device 200

Figure 3B:
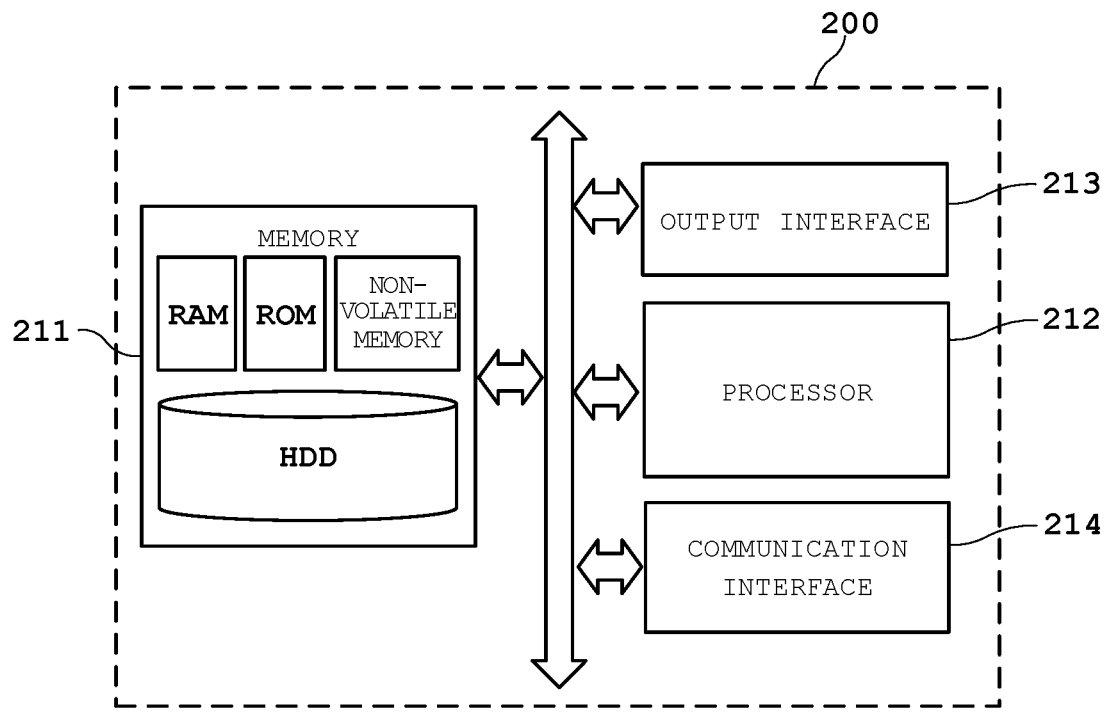
FIG. 3B is a block diagram showing an example of a configuration of a server device 200 according to the first embodiment of the present disclosure.

FIG. 3B is a block diagram showing an example of the configuration of the server device 200 according to the first embodiment of the present disclosure. The server device 200 does not need to include all of the components shown in FIG. 3B. The server device 200 can have a configuration in which some of the components are omitted or other components are added.

According to FIG. 3B, the server device 200 includes a memory 211 including a RAM, a ROM, a non-volatile memory, and an HDD, a processor 212 including a CPU and the like, an output interface 213, and a communication interface 214. The components are electrically connected to one another via a control line and a data line.

The memory 211 includes a RAM, a ROM, a non-volatile memory, and an HDD, and functions as a storage unit. The memory 211 stores instruction commands for executing the game application and OS according to the present embodiment as a program. Such a program is loaded and executed by the processor 212. The memory 211 stores not only the music piece information table and the user information table shown in FIGS. 4A and 4B, but also information of each virtual object disposed in the virtual game space, drawing information thereof, and the like. Furthermore, the memory 211 (RAM in particular) is temporarily used to execute writing and reading of data while the program is executed by the processor 212. In the present embodiment, a program is stored for executing processing of receiving operation information input at the terminal device 100 via the communication interface 214, processing of causing a game application to progress in the terminal device 100 in accordance with the received operation information, processing of selecting one piece of music piece information from the music piece information associated with each user in accordance with specific operation information having been input when the specific operation information is received from the terminal device 100 in the middle of the progress of the game application, processing of selecting one piece of music piece information from the music piece information associated with each user in accordance with the result of the game application, processing of transmitting the selected music piece information to the terminal device 100 via the communication interface 214, processing of associating at least one piece of music piece information with the user by consumption of an in-game virtual item, and the like.

The processor 212 includes a CPU (microcomputer) and functions as a control unit for controlling other components connected on the basis of various programs stored in the memory 211. In the present embodiment, in particular, the processor 212 executes processing of receiving operation information input at the terminal device 100 via the communication interface 214, processing of causing a game application to progress in the terminal device 100 in accordance with the received operation information, processing of selecting one piece of music piece information from the music piece information associated with each user in accordance with specific operation information having been input when the specific operation information is received from the terminal device 100 in the middle of the progress of the game application, processing of selecting one piece of music piece information from the music piece information associated with each user in accordance with the result of the game application, processing of transmitting the selected music piece information to the terminal device 100 via the communication interface 214, and processing of associating at least one piece of music piece information with the user by consumption of an in-game virtual item. The processor 212 may include a single CPU but may include a plurality of CPUs.

The communication interface 214 performs processing such as modulation and demodulation in order to transmit and receive a program, various types of information, and the like for executing the game application according to the present embodiment to and from the terminal device 100 via the network 300 or to and from another server device via the network 300, by way of example. The communication interface 214 communicates with each terminal device and another server device in accordance with the above-described wireless communication method and a known wired communication method. In the present embodiment, user ID information, selection information, operation information, and the like are received from the terminal device 100 in particular, and display information and the like including music piece list information, music piece information, and direction information are transmitted to the terminal device 100.

Although not illustrated, the output interface 213 functions as an information input and output unit for inputting and outputting information to and from various external devices such as a printer and a display. The output interface 213 can adopt a known connection type as desired such as a serial port, a parallel port, and a USB.

4. Information Stored in Each Memory

FIG. 4A is a view conceptually showing a music piece information table stored in the server device 200 according to the first embodiment of the present disclosure. As an example, each time a music piece usable in the game application is newly stored, music piece ID information is generated and stored in the table.

According to FIG. 4A, price information, title information, attribute information, music piece data, and the like are stored in the music piece information table in association with the music piece ID information. The "music piece ID information" is information unique to each music piece and information for specifying each music piece. The "price information" is information indicating the amount of in-game currency necessary for each user to purchase each music piece. That is, at least one piece of music piece information that can be the theme song of each user is associated with the user information table, and the user pays the in-game currency stored as the price information, whereby the music piece information purchased by the user is associated with the user. The "title information" is information indicating the title of each music piece. The "attribute information" is information on the artist providing each music piece, reproduction time, genre, year of recording, or a combination of them. The music piece data is audio data read when each music piece is output from the speaker 119. It is possible to appropriately select an optimum format for the audio data in accordance with the terminal device or the server device of the output destination.

FIG. 4B is a view conceptually showing the user information table stored in the server device 200 according to the first embodiment of the present disclosure. As an example, each time a user newly performs use registration in a game application, user ID information is generated and stored in the table. Each piece of the stored information is updated and stored in accordance with the progress of the game application.

According to FIG. 4B, the user information table stores, in association with the user ID information, user name information, character information, in-game currency information, music piece ID information, direction ID information, and the like. The user ID information is information unique to each user and information for specifying each user. The "user name information" is a name optionally set by each user and is sometimes displayed on the screen of the game application in place of the user ID information. The "character information" is information for specifying a virtual character that can be operated by each user. As an example, each user operates the virtual character, whereby the competition game application progresses with other users or computers. The "in-game currency information" is information indicating the amount of in-game virtual currency held by each user, which is an example of in-game virtual items that can be used in the game application. In the game application, the in-game currency is consumed by purchasing music pieces, directions, virtual objects, virtual characters, and the like, and the payment is added in accordance with the execution result of the game application. Note that not only the in-game currency but also a virtual item such as a virtual coin can be used as the in-game virtual item. The "music piece ID information" is information with which each user specifies a music piece to be used, for example, as a theme song in the game application. As an example, the music piece ID information of a desired music piece included in the music piece information table is associated by consuming the in-game currency. The "director ID information" is information for specifying direction contents when a direction display unique to each user is displayed in the game application. As an example, the direction ID information of a desired direction included in a direction information table (not illustrated) is associated by consuming the in-game currency.

Note that although not illustrated in particular, the memory 211 of the server device 200 stores a direction information table and the like. Similar to the music piece information table, the direction information table stores information such as price information and direction data, and when the user purchases one, it is possible to perform a direction display unique to the user.

5. Example of Output Timing of Direction Information and Music Piece Information FIG. 5 is a view showing a time transition of a musical piece or the like to be output in the game application according to the first embodiment of the present disclosure. Specifically, FIG. 5 is a view showing the relationship between the progress of a competition game application and the direction information and the music piece information that are output to the terminal devices 100 of a user U1 and a user U2 when the competition game application progresses by a plurality of people including the user U1 and the user U2.

FIG. 5 shows a scene of a unit game progressing in the terminal device 100 of the user U1 and the terminal device 100 of the user U2. For example, the user U1 progresses with the unit game in a normal state, and shifts to an implementation state of a killer technique by making a specific operation input at t4. Subsequently, after completing the implementation of the killer technique and returning to the normal state, the specific operation input is made again at t6, thereby shifting to the implementation state of the killer technique. Then, the unit game in progress is completed at t10, and the screen shifts to the result display screen. The user U2 progresses with the unit game in a normal state, and shifts to an implementation state of a killer technique by making a specific operation input at t1. Subsequently, after completing the implementation of the killer technique and returning to the normal state, the specific operation input is made again at t7, thereby shifting to the implementation state of the killer technique. Then, the unit game in progress is completed at t10, and the screen shifts to the result display screen.

FIG. 5 shows the contents of a direction display displayed on the display 111 of each terminal device 100 in the unit game progressing as described above. According to this, since both the user U1 and the user U2 are in a normal state first, a normal screen display is displayed and a specific direction display is not performed in both terminal devices 100. Thereafter, with the implementation of the killer technique by the user U2 at t1, a direction display (direction ID information=E2) associated with the user U2 at the timing of t2 is output to each terminal device 100. Similarly, with the implementation of the killer technique by the user U1 at the timing of t4, a direction display (direction ID information=E1) associated with the user U1 at the timing of t5 is output to each terminal device 100. Furthermore, with the implementation of the killer technique by the user U1 at the timing of t6 and by the user U2 at the timing of t7, a direction display (direction ID information=E1) associated with the user U1 at the timing of t7 and a direction display (direction ID information=E2) associated with the user U2 at the timing of t8 are output to each terminal device 100. Note that the display when a plurality of direction displays is output at an overlapping timing will be described later. Thereafter, with completion of the unit game in progress at t10, the screen shifts to the result display screen. At this time, in the example of FIG. 5, since the user U1 wins (first place) in the unit game, the direction display (direction ID information=E1) associated with the user U1 is output to each terminal device 100. Note that in the example of FIG. 5, the case where the same direction display is performed in any direction display is explained, but a different direction display may be performed in accordance with timing even in a direction display associated with the same user. For example, the direction display in which the direction ID information associated with the user U1 is "E1-1" may be output at the timing of t5, and the direction display in which the direction ID information associated with the user U1 is "E1-2" may be output at the timing of t10.

FIG. 5 shows a music piece output to the speaker 119 of each terminal device 100 in the unit game progressing as described above. According to this, since both the user U1 and the user U2 are in a normal state first, a normal BGM is output in any terminal device 100. Note that examples of a normal BGM includes each music piece associated with each user. That is, in this case, the terminal device 100 of each user outputs each music piece associated with each user (e.g., the terminal device 100 of the user U1 outputs a music piece of the music piece ID information=S1 associated with the user U1, and the terminal device 100 of the user U2 outputs a music piece of the music piece ID information=S2 associated with the user U2). Thereafter, in a case where a killer technique is implemented by the user U2 at t1 and a predetermined condition is satisfied as a result (e.g., in a case of giving the opponent a damage by the killer technique), the music piece (music piece ID information=S2) associated with the user U2 at the timing of t3 is output to each terminal device 100. That is, while the terminal device 100 of the user U2 outputs the music piece of the music piece ID information=S2 that is output in the normal state, the terminal device 100 of the user U1 switches from the music piece of the music piece ID information=S1 that is output in the normal state to the music piece of the music piece ID information=S2 associated with the user U2 and outputs the music piece of the music piece ID information=S2. On the other hand, the killer technique is implemented by the user U1 also at the timing t4, but in a case where the predetermined condition is not satisfied as a result, the music piece associated with the user U1 is not output. Thereafter, in a case where the killer technique is implemented by the user U1 at the timing of t6 and by the user U2 at the timing of t7, and, of the techniques, only the killer technique implemented by the user U1 satisfies the predetermined condition, the music piece (music piece ID information=S1) associated with the user U1 is output to each terminal device 100 at the timing of t9 after the completion of the killer technique. That is, while the terminal device 100 of the user U1 outputs the music piece of the music piece ID information=S1 that is output in the normal state, the terminal device 100 of the user U2 switches from the music piece of the music piece ID information=S2 that is output in the normal state to the music piece of the music piece ID information=S1 associated with the user U1 and outputs the music piece of the music piece ID information=S1. Then, with completion of the unit game in progress at t10, the screen shifts to the result display screen. At this time, in the example of FIG. 5, the user U1 wins (first place) in the unit game, the music piece (music piece ID information=S1) associated with the user U1 is output to each terminal device 100. That is, while the terminal device 100 of the user U1 outputs the music piece of the music piece ID information=S1 that is output in the normal state, the terminal device 100 of the user U2 switches from the music piece of the music piece ID information=S2 that is output in the normal state to the music piece of the music piece ID information=S1 associated with the user U1 and outputs the music piece of the music piece ID information=S1. Note that in the example of FIG. 5, the case where the same music piece is output at the timings t9 and t10 is explained, but a different music piece may be output in accordance with timing even if a music piece is associated with the same user. For example, the music piece in which the music piece ID information associated with the user U1 is "S1-1" may be output at the timing of t9, and the music piece in which the music piece ID information associated with the user U1 is "S1-2" may be output at the timing of t10.

6. Processing Flow Performed by the Server Device 200

Figure 6:
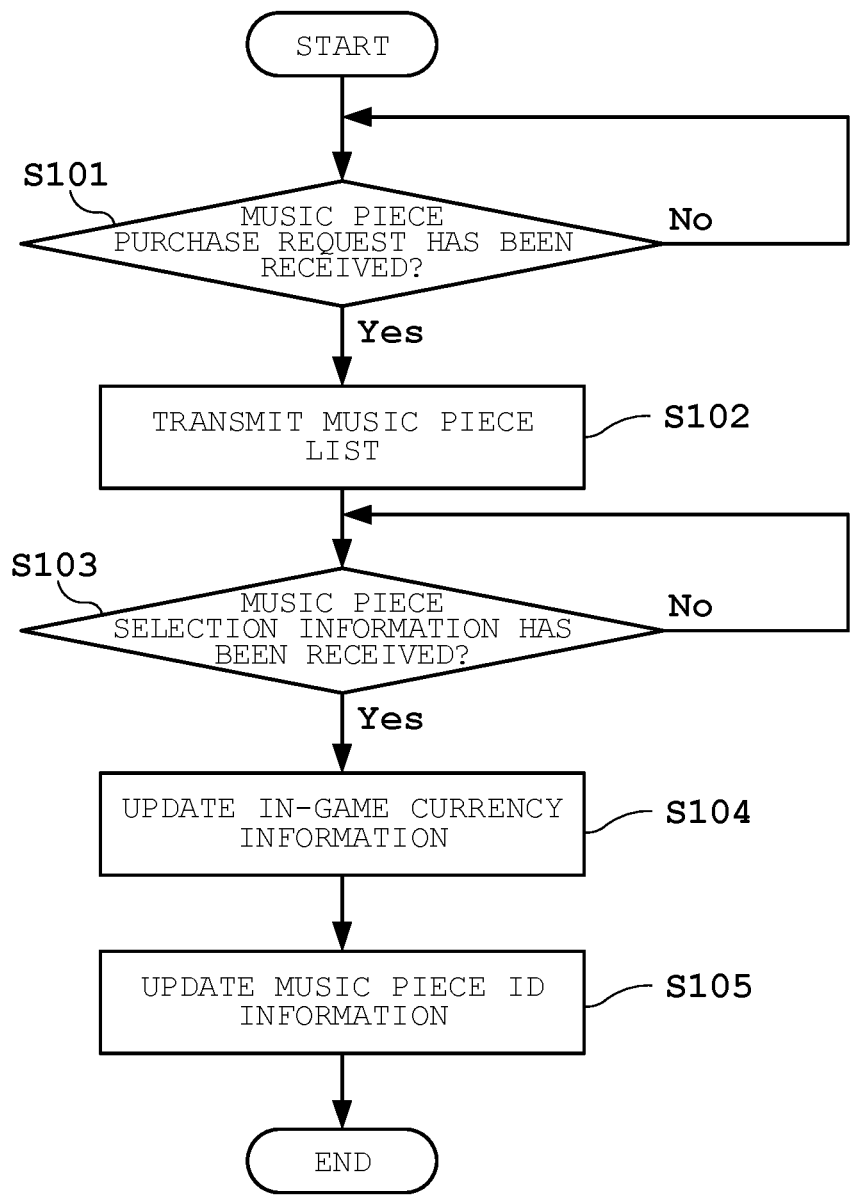
FIG. 6 is a view showing a processing flow executed in the server device 200 according to the first embodiment of the present disclosure.

FIG. 6 is a view showing a processing flow executed in the server device 200 according to the first embodiment of the present disclosure. Specifically, FIG. 6 shows a processing flow executed in the server device 200 when a user purchases a music piece in the game application.

According to FIG. 6, the processor 212 is started by receiving an interrupt signal due to receiving of a music piece purchase request from the terminal device 100 via the communication interface 214 (S101).

Figure 9:
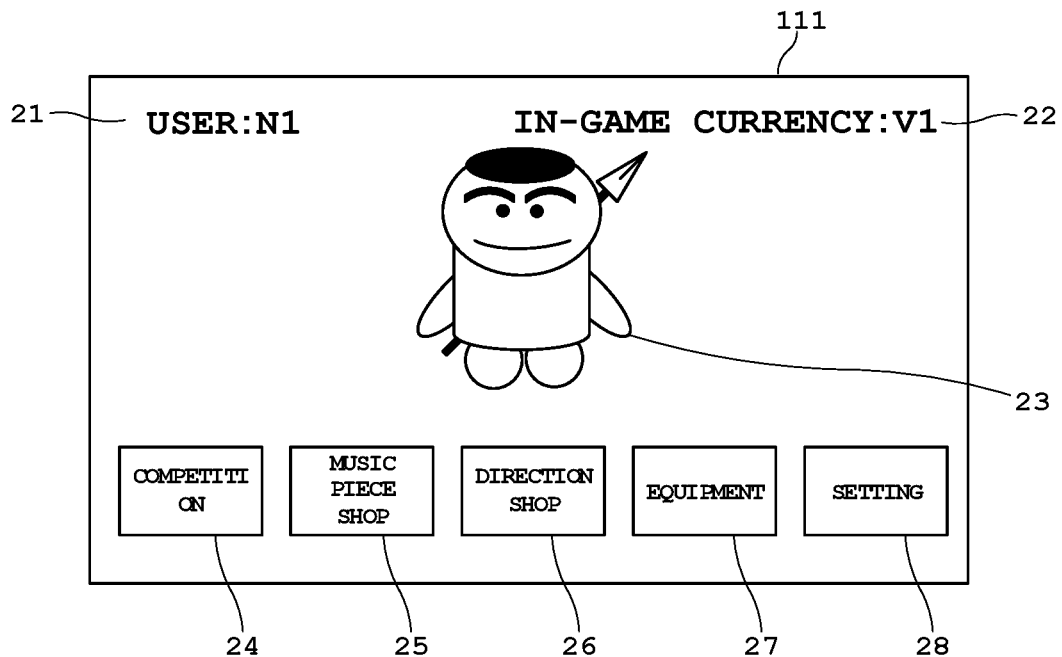
FIG. 9 is a view showing an example of a screen displayed on the terminal device 100 according to the first embodiment of the present disclosure.

Here, FIG. 9 is a view showing an example of a screen displayed on the terminal device 100 according to the first embodiment of the present disclosure. Specifically, FIG. 9 shows an example of a screen displayed on the display 111 of the terminal device 100 when a music piece purchase request is transmitted from the terminal device 100 to the server device 200. According to FIG. 9, an initial screen of the game application is displayed on the display 111 of the terminal device 100. The initial screen displays the user name information of a user executing the game application in an upper left region 21, and displays the amount (V1) of in-game currency currently owned by the user in an upper right region 22. An image of a virtual character that can be operated by the user is displayed in a substantially center region 23 of the initial screen. Furthermore, various icons for transitioning to the next screen are displayed at the bottom of the initial screen. Upon receiving the operation information of the user for a competition icon 24 via the touch screen 117 or the controller 118, a competition request is transmitted to the server device 200, and the screen shifts to a competition mode screen (not illustrated). Upon receiving the operation information of the user for a music piece shop icon 25 via the touch screen 117 or the controller 118, a music piece purchase request is transmitted to the server device 200 via the communication interface 114. Upon receiving the operation information of the user for a direction shop icon 26 via the touch screen 117 or the controller 118, a direction purchase request is transmitted to the server device 200 via the communication interface 114. Upon receiving the operation information of the user for an equipment icon 27 via the touch screen 117 or the controller 118, the screen shifts to an equipment screen for exchanging and setting attack items and defense items equipped by the virtual character. Upon receiving the operation information of the user for a setting icon 28 via the touch screen 117 or the controller 118, the screen shifts to a setting screen for making various settings for progressing the game application. Thus, in S101 of FIG. 6, as an example, on the initial screen displayed on the display 111 of the terminal device 100, the music piece purchase request transmitted by receiving the operation information of the user for the music piece shop icon 25 is received.

Returning to FIG. 6 again, upon receiving the music piece purchase request in S101, the processor 212 transmits a music piece list to the terminal device 100 via the communication interface 214 (S102). Next, the processor 212 waits until receiving an interrupt signal due to receiving of the music piece selection information from the terminal device 100 via the communication interface 214 (S103).

Figure 10:
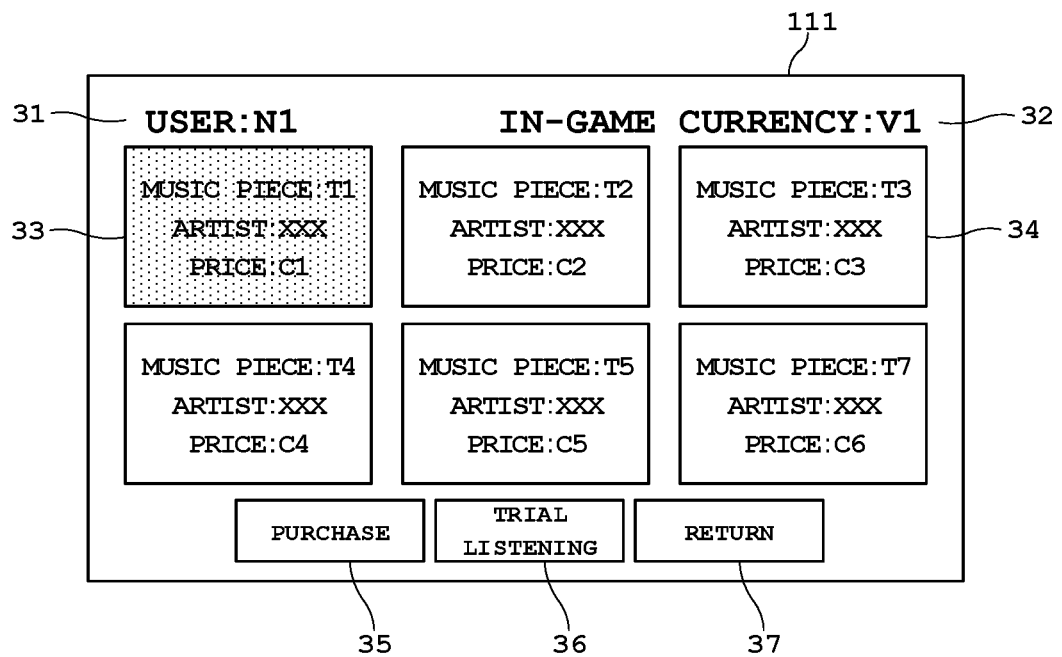
FIG. 10 is a view showing an example of a screen displayed on the terminal device 100 according to the first embodiment of the present disclosure.

Here, FIG. 10 is a view showing an example of a screen displayed on the terminal device 100 according to the first embodiment of the present disclosure. Specifically, FIG. 10 shows an example of a screen displayed on the display 111 of the terminal device 100 when music piece selection information is transmitted from the terminal device 100 to the server device 200. According to FIG. 10, the display 111 of the terminal device 100 displays a music piece purchase screen of the game application. Similar to the initial screen, the music piece purchase screen displays the user name information of a user executing the game application in an upper left region 31, and displays the amount (V1) of in-game currency currently owned by the user in an upper right region 32. In a substantially center of the music piece purchase screen, one or a plurality of music piece icons 33 and 34 are disposed. Each music piece icon displays not only the title information of the music piece but also the attribute information (artist information), the price information, and the like that are received from the music piece information table. Then, upon receiving the operation information of the user for a desired music piece icon via the touch screen 117 or the controller 118, as in the music piece icon 33, for example, the icon is displayed in a different display mode from that of the other music piece icon 34. Furthermore, at the lower part of the music piece purchase screen displays a purchase icon 35, a view icon 36, and a return icon 37. Upon receiving the operation information of the user for the purchase icon 35 via the touch screen 117 or the controller 118, the music piece ID information of the music piece icon 33 changed to a different display mode is transmitted as music piece selection information together with the user ID information to the server device 200 via the communication interface 114. Upon receiving the operation information of the user for the view icon 36 via the touch screen 117 or the controller 118, the music piece ID information of the music piece icon 33 changed to a different display mode is transmitted as view selection information to the server device 200 via the communication interface 114, at least a part of the music piece is received from the server device 200, and the music piece is output so that the user can view. Upon receiving the operation information of the user for the return icon 37 via the touch screen 117 or the controller 118, the screen is shifted to the previous screen. Thus, in S103 of FIG. 6, as an example, on the music piece selection screen displayed on the display 111 of the terminal device 100, the music piece selection information to be transmitted is received by receiving the operation information of the user for the music piece icon 33 desired by the user and the purchase icon 35.

Returning to FIG. 6 again, upon receiving the music piece selection information in S103, the processor 212 refers to the music piece information table to read the price information associated with the music piece ID information included in the received music piece selection information. Then, the processor 212 subtracts the price information having been read from the in-game currency information stored in the user information table in association with the user ID information, and updates and stores the subtracted value as the in-game currency information (S104). Then, the processor 212 stores the music piece ID information included in the music piece selection information in the music piece ID information of the user information table in association with the user ID information (S105). Thus, the processing flow of the server device 200 regarding the music piece purchase ends.

Figure 7:
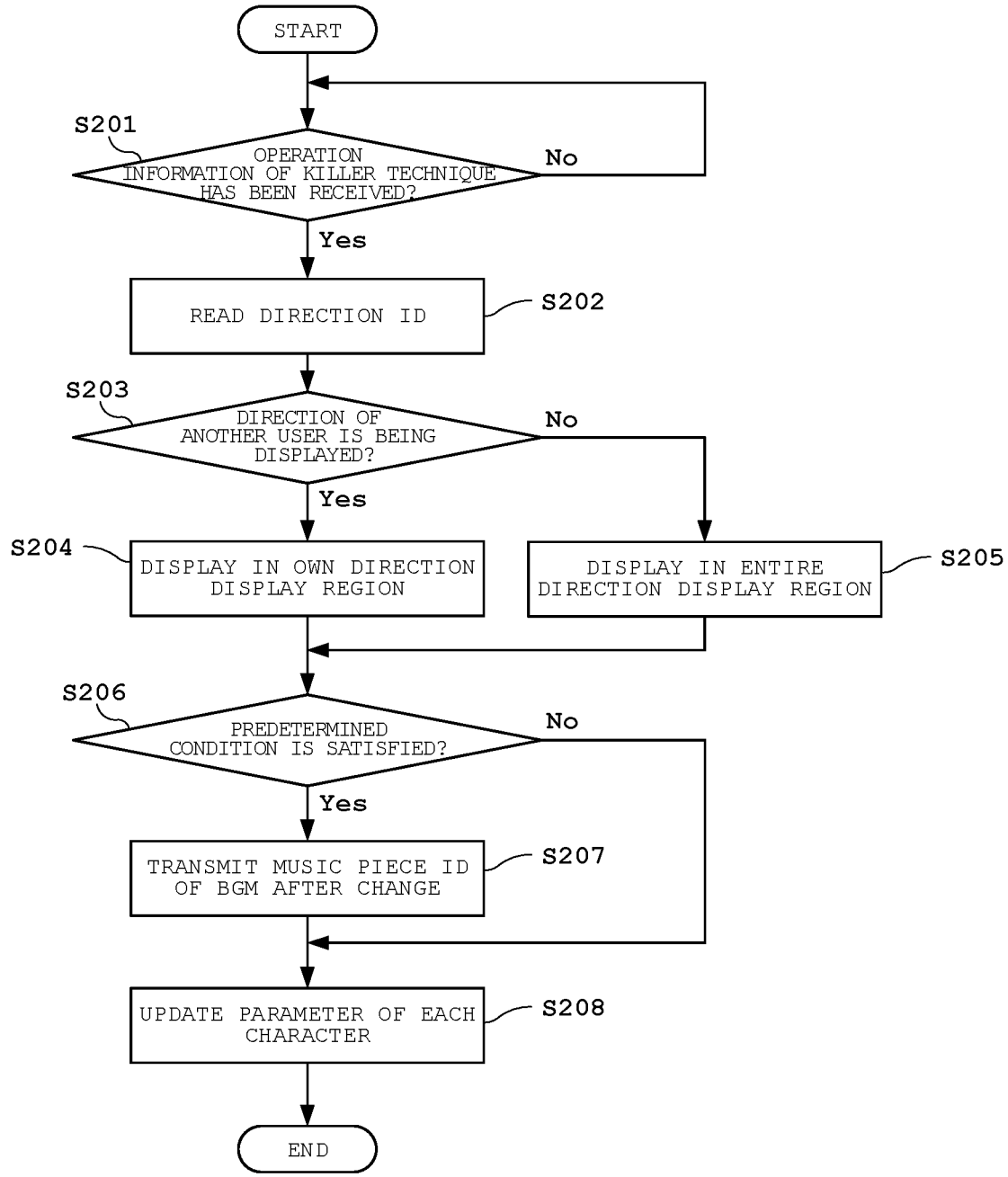
FIG. 7 is a view showing a processing flow executed in the server device 200 according to the first embodiment of the present disclosure.

FIG. 7 is a view showing a processing flow executed in the server device 200 according to the first embodiment of the present disclosure. Specifically, FIG. 7 shows a processing flow executed in the server device 200 when specific operation information is received in the middle of the progress of the competition game in the unit game of the game application.

According to FIG. 7, the processor 212 is started by receiving an interrupt signal due to receiving of specific operation information (e.g., operation information of implementation of a killer technique) from the terminal device 100 via the communication interface 214 (S201). Upon receiving the interrupt signal of the specific operation information, the processor 202 refers to the user information table to read the direction ID information associated with the user ID information of the user of the terminal device 100 having transmitted the specific operation information (S202). At this time, if the direction information has already been output to another user (S203: i.e., the timing of t7 in FIG. 5), the processor 212 transmits, to each terminal device 100 via the communication interface 214, the direction ID information having been read and information indicating the display position thereof so as to display the direction in the direction display region corresponding to the user who has transmitted the specific operation information to each terminal device 100 (S204). On the other hand, if the direction information has not yet been output to another user (i.e., the timings of t1, t4, and t6 in FIG. 5), the processor 212 transmits, to each terminal device 100 via the communication interface 214, the direction ID information having been read and information indicating the display position thereof so as to display the direction in the entire direction display screen to each terminal device 100 (S205).

Figure 11:
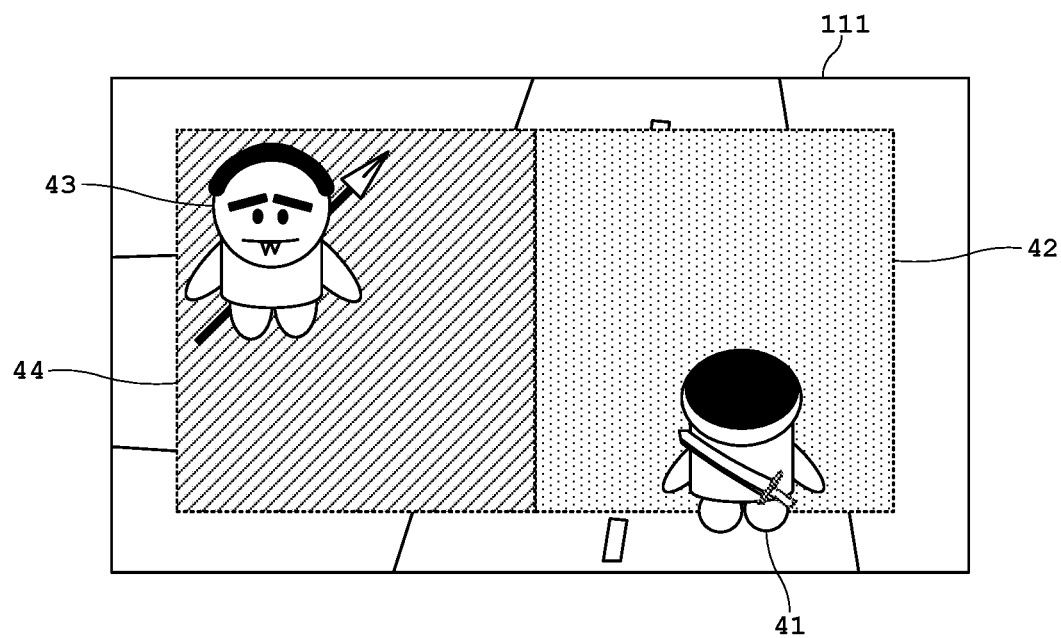
FIG. 11 is a view showing an example of a screen displayed on the terminal device 100 according to the first embodiment of the present disclosure.

Here, FIG. 11 is a view showing an example of a screen displayed on the terminal device 100 according to the first embodiment of the present disclosure. Specifically, FIG. 11 shows an example of a screen displayed when a killer technique is implemented by each user (i.e., timing of t8 in FIG. 5) in the middle of the progress of the competition game in the unit game. According to FIG. 11, the screen displays a virtual character 41 of the user U1 and a virtual character 43 of the user U2, which become opponents in the competition game so as to face each other. On the background thereof, a direction display region 42 corresponding to the virtual character 41 of the user U1 and a direction display region 44 corresponding to the virtual character 43 of the user U2 are displayed. Here, the killer technique by the virtual character 41 and the killer technique by the virtual character 43 are implemented at an overlapping timing. Therefore, the direction display region 42 displays the direction (direction ID information=E1) stored in association with the user U1, and the direction display region 44 displays the direction (direction ID information E2) stored in association with the user U2. Note that in a case where the timings of implementation of the killer technique by the virtual character 41 and by the virtual character 43 do not overlap (i.e., the timing of t1, t4, and t6 in FIG. 5 and the case of S205 in FIG. 7), the direction associated with the user ID information of the virtual character implementing the killer technique is displayed in the entire region including both the direction display region 42 and the direction display region 44.

Returning to FIG. 7 again, upon completion of the implementation of the killer technique, the processor 206 determines whether or not the predetermined condition has been satisfied (S206). Examples of this condition include whether or not a predetermined damage has been given to the virtual character of the user who becomes an opponent by the killer technique. Note that this condition is only an example, and any condition may be used as long as it affects the progress of another unit game, such as the amount of given damage and the number of virtual characters to which damage has been given. If the condition is satisfied, the processor 212 transmits, to each terminal device 100 via the communication interface 214, the music piece ID information associated with the user of the virtual character who has implemented the killer technique (S207). Therefore, in any terminal device 100, the music piece is switched to the music piece of the music piece ID associated with the user of the virtual character who has implemented the killer technique and is output. Note that each terminal device 100 having received the music piece ID information outputs the music piece corresponding to the music piece ID information from the speaker 119. Therefore, it becomes possible for another user to know that the user whose theme song is the music piece has become a significant state in the unit game. It becomes possible for the user himself/herself who has implemented the killer technique to have a sense of superiority to other users because his/her own theme song is output to terminal devices including the terminal device 100 of the other users.

Then, on the basis of the damage given to the virtual character of the opponent, the processor 206 updates and stores various parameters (e.g., hit point parameter) stored in association with the virtual character (S208). Thus, the processing flow executed when the specific operation information is received ends.

Figure 8:
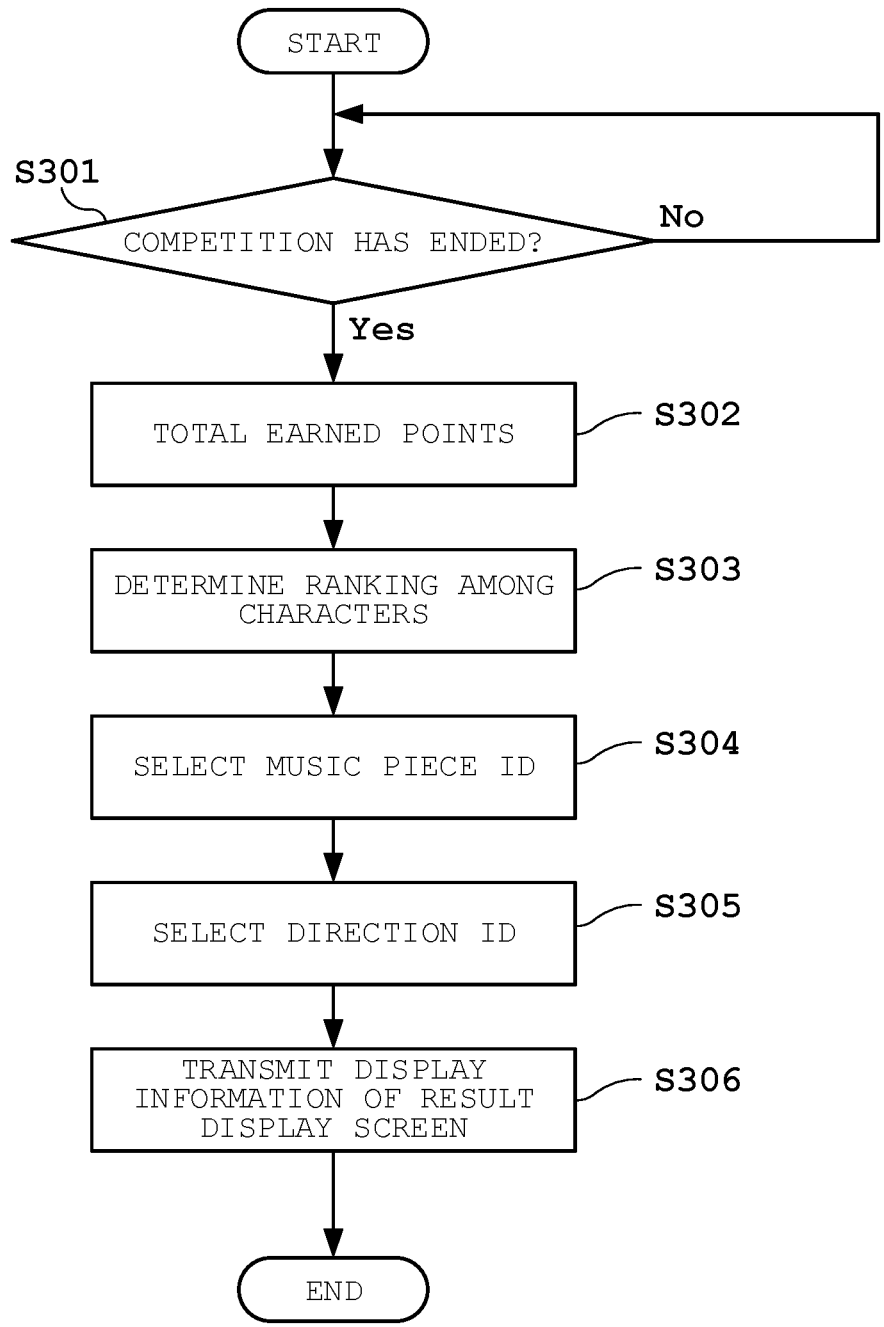
FIG. 8 is a view showing a processing flow executed in the server device 200 according to the first embodiment of the present disclosure.

FIG. 8 is a view showing a processing flow executed in the server device 200 according to the first embodiment of the present disclosure. Specifically, FIG. 8 shows a processing flow executed in the server device 200 when the unit game of the game application is completed and the result is displayed.

According to FIG. 8, the processor 212 determines whether or not the competition game in the unit game has ended on the basis of the result of the update processing of the hit point parameter shown in S208 of FIG. 7 and the result of the update processing of the hit point parameter in the competition in the normal state (S301). When the competition ends (e.g., when hit point parameters of all virtual characters except one virtual character become zero), the processor 212 totals the points earned in the unit game (S302). Note that in a case of determining the ranking simply by the winning or losing in the competition, it is possible to omit the step. Then, the processor 212 determines the ranking among the virtual characters on the basis of the earned points (S303).

When the ranking is determined, the processor 212 refers to the user information table to read the music piece ID information and the direction ID information on the basis of the user ID information of the winning user (e.g., first-place user) (S304 and S305). Then, the processor 212 transmits the music piece ID information and the direction ID information having been read to each terminal device 100 via the communication interface 214 (S306). Therefore, in any terminal device 100, the music piece is switched to the music piece of the music piece ID associated with the winning user and is output.

Figure 12:
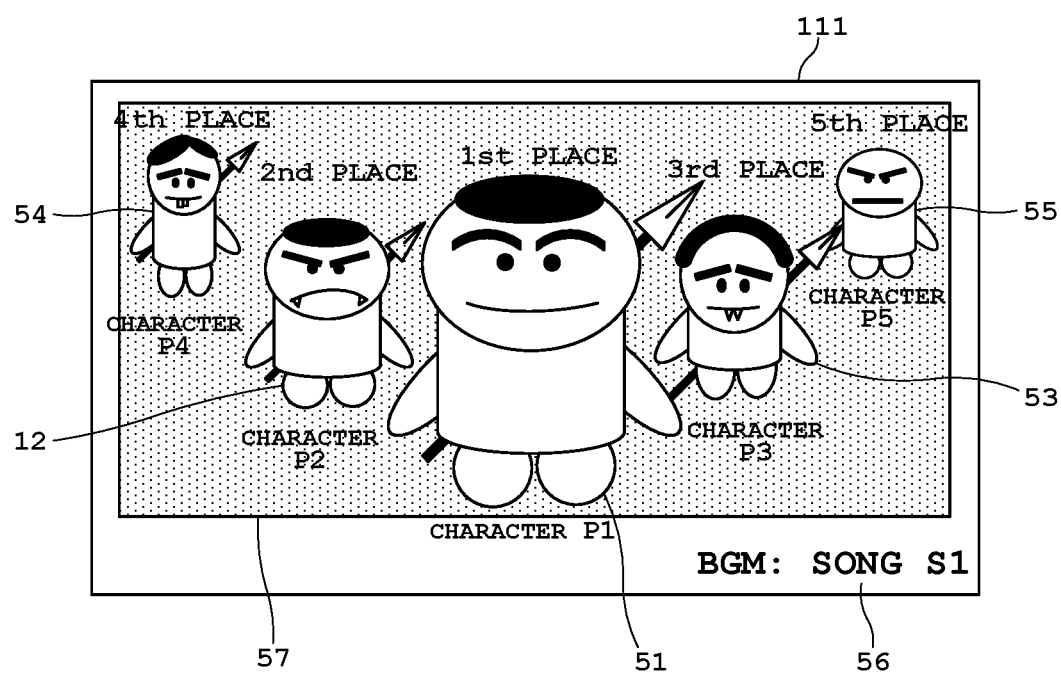
FIG. 12 is a view showing an example of a screen displayed on the terminal device 100 according to the first embodiment of the present disclosure.

Here, FIG. 12 is a view showing an example of a screen displayed on the terminal device 100 according to the first embodiment of the present disclosure. Specifically, FIG. 12 shows an example of a result display screen displayed when the competition game is completed in the unit game. According to FIG. 12, on the screen, the virtual characters P1 to P5 ranked from the first-place to fifth-place in accordance with the points earned by the competition game application are displayed at the positions 11 to 15 corresponding to the ranking, respectively. At this time, the virtual characters are displayed so that the size of the virtual characters varies according to the rank. In a music piece information display region 16 at the lower right of the result display screen, music piece ID information of the music piece currently being output from a speaker connected to the terminal device 100 is displayed. That is, when this result display screen is displayed, a music piece S1 associated with a user U1 capable of operating the character P1 is being output from the speaker. A direction display region 17 is displayed on the result display screen. In the direction display region 17, a direction (e.g., "Congratulations on the victory of the user U1!") associated in advance with the user U1 capable of operating the character P1 is displayed. Note that the music piece S1 is output by storing in advance the music piece data associated with various pieces of music piece ID information in the memory 113 of the terminal device 100, and reading and outputting the music piece data corresponding to the music piece ID information upon receiving the music piece ID information.

As described above, in the present embodiment, it becomes possible to provide the user with a new experience by outputting a music piece associated in advance with each user in accordance with the result of the game application. In particular, by causing all users participating in the competition game to listen to a music piece (e.g., theme song) associated with the winning user, the winning user can have a sense of superiority to other users, and the other users can encourage rivalry against the winning user.

Other Embodiments

In the first embodiment, the server device 200 is used as a processing device, and various types of processing according to FIGS. 6 to 8 are executed by the processor 212. However, the present invention is not limited to this, and it is also possible to use the terminal device 100 as a processing device, and to execute various types of processing according to FIGS. 6 to 8 by the processor 112. At this time, the other terminal device 100 may be connected directly via the communication interface 114 or may be connected via the server device. The memory 113 of the terminal device 100 functioning as a processing device may store the music piece information table and the user information table shown in FIGS. 4A and 4B.

In the first embodiment, one or a plurality of terminal devices 100 are connected to the server device 200, and the same music piece information and direction information are transmitted to each terminal device. However, the present invention is not limited to this, and different direction information and music piece information may be transmitted to each terminal device.

In the first embodiment, direction ID information and music piece ID information are transmitted from the server device 200 to each terminal device 100 as direction information and music piece information, and the music piece is output by reading the direction data and music piece data stored in advance in the terminal device 100. However, the present invention is not limited to this, and direction data and music piece data may be transmitted from the server device 200 to each terminal device 100 as direction information and music piece information, and the received direction data and music piece data may be output from each terminal device 100.

It is also possible to combine the elements described in the embodiments as appropriate or to replace them to form a system.

The processing and procedures described in the present description can be realized not only by those explicitly described in embodiments but also by software, hardware, or a combination thereof. Specifically, the processing and procedures described in the present description are realized by implementing a logic corresponding to the processing into an integrated circuit or a medium such as a volatile memory, a non-volatile memory, a magnetic disk, and an optical storage. The processing and procedures described in the present description can be implemented as a computer program and executed by various computers including the terminal device and the server device.

Even if it is described that the processing and procedures described in the present description are executed by a single device, software, a component, or a module, such processing and procedures can be executed by a plurality of devices, a plurality of pieces of software, a plurality of components, and/or a plurality of modules. Even if it is described that various types of information described in the present description are stored in a single memory or storage unit, such information can be distributed and stored in a plurality of memories provided in a single device or a plurality of memories distributed and disposed in a plurality of devices. Furthermore, the software and hardware elements described in the present description can be realized by integrating them into a smaller number of components or breaking them into a larger number of components.

The processing device, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A processing device comprising:
a communication interface configured to be communicably connected via a network with one or a plurality of terminal devices including a first terminal device;
a memory configured to store computer readable instructions and music piece information, the music piece information being associated with one or a plurality of users including a first user holding the first terminal device; and
a processor configured to execute the computer readable instructions so as to:
cause a game application to progress in the first terminal device in accordance with operation information that is input at the first terminal device;
select first music piece information from the stored music piece information in accordance with a progress result of the game application; and
transmit the selected first music piece information to the first terminal device via the communication interface.

2. The processing device according to claim 1,
wherein the game application is a competition game application between the first user and another user of the plurality of users, and the another user holds another terminal device of the plurality of terminal devices.

3. The processing device according to claim 2,
wherein, when the first user of the first terminal device wins as the progress result of the game application, the selected first music piece information that is associated with the first user is transmitted to the first terminal device via the communication interface.

4. The processing device according to claim 2,
wherein, when the another user of the another terminal device wins as the progress result of the game application, the processor is configured to select second music piece information from the stored music piece information that is associated with the another user and transmit the selected second music piece information to the another terminal device via the communication interface.

5. The processing device according to claim 1,
wherein the processor is configured to display a result screen on a display of the first terminal device, and
the processor is configured to play a music piece specified by the selected first music piece information from a speaker of the first terminal device while the result screen is displayed on the display.

6. The processing device according to claim 1,
wherein, when specific operation information of the operation information is input at the first terminal device during the progress of the game application, the processor is configured to select third music piece information from the stored music piece information, and
the selected third music piece information is associated with the specific operation information.

7. The processing device according to claim 1,
wherein the memory is further configured to store an amount of in-game virtual items consumed in the game application in association with the one or the plurality of users, and
each of the music piece information is associated with each user of the one or the plurality of users in association with consumption of the amount of the in-game virtual items by each user of the one or the plurality of users.

8. The processing device according to claim 1,
wherein the memory is configured to store direction information in association with the one or the plurality of users, and the processor is configured to select first direction information from the stored direction information in accordance with the progress result of the game application.

9. A computer program product embodying computer readable instructions stored on a non-transitory computer-readable storage medium for causing a computer including a communication interface configured to be communicably connected via a network with one or a plurality of terminal devices including a first terminal device, and a memory configured to store music piece information, the music piece information being associated with one or a plurality of users including a first user holding the first terminal device, to execute a process by a processor so as to perform the steps of:
    causing a game application to progress in the first terminal device in accordance with operation information that is input at the first terminal device;
    selecting first music piece information from the stored music piece information in accordance with a progress result of the game application; and
    transmitting the selected first music piece information to the first terminal device via the communication interface.

10. A method performed for causing a processor in a computer to execute a process, the computer including a communication interface configured to be communicably connected via a network with one or a plurality of terminal devices including a first terminal device, and a memory configured to store computer readable instructions and music piece information, the music piece information being associated with one or a plurality of users including a first user holding the first terminal device, the method comprising executing the computer readable instructions on the processor the steps of:
    causing a game application to progress in the first terminal device in accordance with operation information that is input at the first terminal device;
    selecting first music piece information from the stored music piece information in accordance with a progress result of the game application; and
    transmitting the selected first music piece information to the first terminal device via the communication interface.

\* \* \* \* \*